United States Patent Office 3,048,493
Patented Aug. 7, 1962

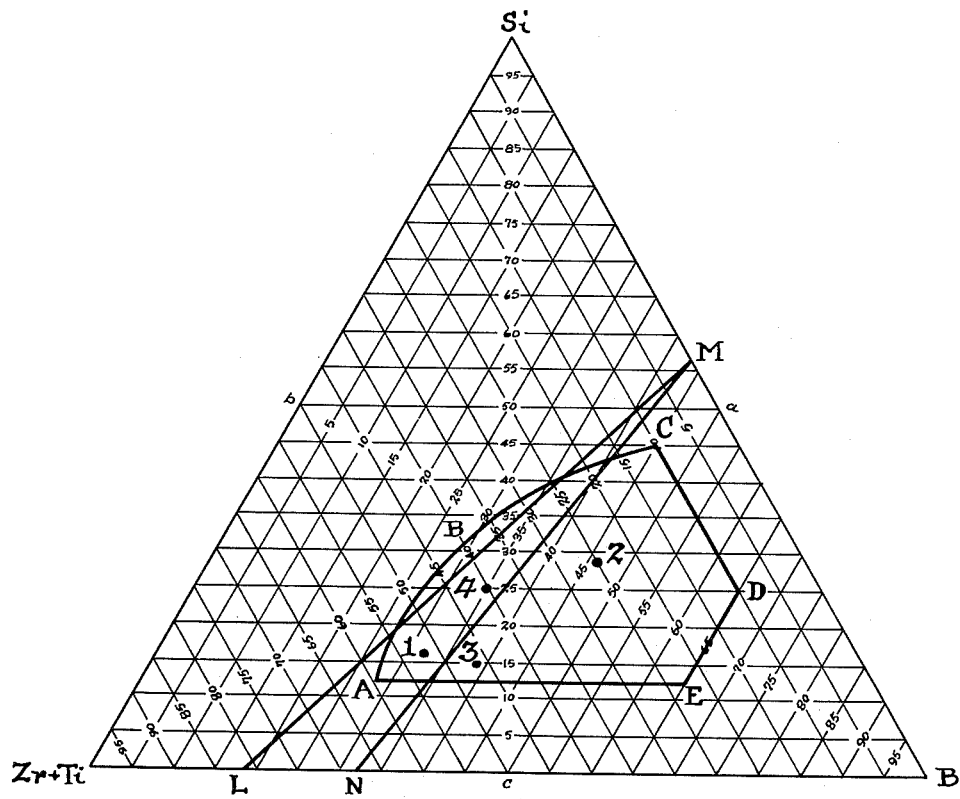

3,048,493
HARD ABRASIVE MATERIAL AND METHOD OF MAKING
Norman P. Robie, Hamburg, N.Y., assignor to Electro Refractories & Abrasives Corporation, Buffalo, N.Y.
Filed May 19, 1959, Ser. No. 814,225
8 Claims. (Cl. 106—55)

This invention relates to new hard materials consisting of interfused mixtures composed principally of boron, silicon and a transition element of the group consisting of titanium and zirconium with or without other elements also present and to a method of making the same.

Various borides are known to be hard, high melting materials. Their commercial utilization has not however been widespread because of their high cost plus the fact that as heretofore made they occur as fine powders whose abrasive properties are hard to utilize. This has resulted from their method of manufacture which has been by heating together the elements or their hydrides or by chemical reduction of their purified oxides at temperatures insufficient to fuse the borides. Silicides have likewise been known to be hard but except for silicon carbide have found little use.

I have found it possible to produce inter-compounds, possibly boro-silicides or silico-borides having great hardness by fusing together boron oxide and the oxides or silicates of zirconium and/or titanium together with added silica in certain instances and sufficient carbon to reduce all the oxygen present to form CO as will be hereinafter disclosed. These silico borides form metallic pigs of great hardness which can be crushed to desired grit sizes and used as abrasives, either in bonded form or in lapping compounds.

They may also be used for the production of hard wear resistant surfaces such as surface plates, gauge facings, thread guides, orifices, sand blast nozzles and the like or to form lathe cutting tools, and hard surfacing welding rods. I may also employ them as metallurgical addition agents. When admixed with powdered metals like nickel and cobalt, they may be pressed and fired to form cermets and in this form or otherwise are useful for electrical contact points and the like or for refractory uses such as rocket nozzles and combustion chambers.

I have found that for refractory uses, my compositions can be used best in vacuum or in inert atmospheres.

I have not identified the exact physical constituents which are present in my composition due to the difficulty of making such determinations. I rely rather upon the chemical composition of the mixture and its complete fusion. It is my belief that the crystals of various borides present may be to some extent in solid solution in each other or in boron carbide which is known to be an excellent solvent and may be present in minor amounts. Excess boron above the amount required to form diborides also presumably exists in some of my compositions, either admixed or in solid solution.

In one method of making my material, I start with zircon sand plus boric oxide plus sufficient carbon to reduce all the oxides present, forming CO and leaving the Zr, B and Si in elemental form to combine with one another. The zircon, $B_2O_3$ and carbon are mixed and fed slowly to the arc furnace. In this process, silica and $B_2O_3$ are vaporized to some extent. Since I want a material proportion of silicon in my final product to keep my cost down, I may admix additional silica with the other ingredients and reduce them simultaneously.

In another method, I start with rutile to which I add silica and boric oxide with sufficient carbon to reduce all the oxides present to CO, thus converting the titanium, silicon and boron to elemental forms which interfuse and react with one another. I find it desirable to add up to about 10% more carbon than is theoretically required for this reduction in order to prevent reoxidation by the surrounding admosphere and to compensate for carbon burned up in the furnacing operation.

In still another approach to my invention, I may use carbides and particularly silicon carbide as an ingredient in my mix in place of or in addition to the oxides such as silica. In this way the silicon content of my final product can be built up and the volatilization of $SiO_2$ greatly decreased or avoided depending upon the other ingredients used. The carbon of the SiC or other carbide is moreover available to reduce chemically the oxidic constituents of the mix in whole or in part in the same way that separately added carbon reduces them. Such use of SiC is of course somewhat costly but the great reduction in the amount of silica smoke driven off from the furnace is very advantageous in improving working conditions around it. An example of such use of carbide in a mix is given as Example 5 below.

In some cases as exemplified below, I may use the sulfur of a sulfide as part of my reducing agent. Like carbon, the sulfur forms a gaseous oxide which is eliminated in the process. The use of sulfur is of most use when the sulfide is a relatively cheap natural ore of a metal such as Mo which it is desired to incorporate in the final melt.

The general scope of my invention is shown in examples below and in the accompanying diagram where:

The drawing shows a tri-axial diagram of the system boron, silicon and metal, the metal being zirconium or titanium, with an encircled area indicating the limits within which my preferred compositions fall.

In the drawing, I have drawn line LM to connect points representing $ZrB_2$ and $SiB_2$ respectively and line MN to connect points representing $SiB_2$ and $TiB_2$ respectively. I have found that mixtures lying to the left of these lines are softer than those lying on the high boron side of them. By experiments over a wide range I have moreover found that, mixtures containing more Si than the 12% represented by line AE and at least 10% of either or both Zr and Ti as represented by line CD are readily furnaced and yield products of excellent abrasive merit.

In the drawing, I have also drawn in an irregular line ABC, on the high boron side of which line I find that my fused mixes are harder than and capable of abrading silicon carbide. Line DE is drawn somewhat arbitrarily as representing a level of boron beyond which cost becomes disproportionately large with respect to benefits derived, even through mixes higher in boron are very hard.

I have found that for best results the relative proportions of the various ingredients in my fused product should be such as to make the ratio of the various "metal" components therein fall within the following limits (with boron always on the high side of line ABC).

| | Parts by weight |
|---|---|
| Zirconium and/or titanium | 10 to 60 |
| Silicon | 12 to 45 |
| Boron | 27 to 65 |

The titanium and zirconium may be intermixed in any desired proportion though the Zr ingredients are the cheaper.

As noted above, some silica and boric oxide are lost by volatilization in the process of fusion so that the composition of my final fused product tends to be somewhat closer to the lower left corner of the diagram than is that of the starting mixture but this charge can be allowed for in formulation.

Minor amounts of other boride forming metals may be added in my melts for special uses. Calculating the zirconium and/or titanium plus silicon plus boron as 100% and keeping their relative proportions within the above limits I may add up to 10% of other metals capable of forming hard borides, as for instance Mo in Example 4 below. Particularly for refractory uses I may include Mo in this way keeping the ratio between the other ingredients in my preferred range as stated. Such Mo-containing bodies form a refractory Mo silicate when exposed to oxidation which coats over and protects the silico-borides.

The exact nature of my invention and its practice will be more apparent from the following examples:

*Example 1*

A mixture of the following ingredients was fused together in an electric arc furnace:

| | Lbs. |
|---|---|
| Zircon sand | 100 |
| $B_2O_3$ | 94.7 |
| Coke breeze | 75 |

This mixture contains Zr, Si and boron in proportions falling at point 1 on the diagram. As fusion progressed, a dark gray, metallic appearing pig was built up. This had a density of 4.81, showed high electrical conductivity and was very hard. A number of interesting tests using this material are described below.

*Example 2*

Another fusion was made using a mixture of:

| | Lbs. |
|---|---|
| Rutile | 80 |
| Powdered silica | 120 |
| $B_2O_3$ | 280 |
| Coke | 216 |

This fused to a hard silvery metallic pig. This material corresponds to point 2 on the diagram. The material abraded SiC with ease.

*Example 3*

Here I mixed both rutile and zircon for fusion in the following proportions:

| | Lbs. |
|---|---|
| Zircon sand | 100 |
| Rutile ore | 64 |
| $B_2O_3$ | 151 |
| Carbon | 125 |

The fused product was again a silvery metallic mass, very hard and very refractory. The ratio of (Ti+Zr):Si:B was 47:14:39 placing it at point 3 on the diagram. This material also abraded SiC readily.

*Example 4*

This mix illustrates the use of sulfide sulfur to replace part of the carbon as the reducing agent. The raw mix consisted of:

| | Lbs. |
|---|---|
| Zircon sand | 120 |
| Silica sand | 55 |
| $MoS_2$ (molybdenite) | 25 |
| $B_2O_3$ | 170 |
| Carbon | 67 |

During the fusion large quantities of $SO_2$ were given off. The fused product was again a very hard abrasive material. Mix composition indicates that allowing for loss of half of the added silica by volatilization the final Zr:Si:B ratio would be 40:25:35 corresponding to point 4 on the diagram but with 10% Mo by weight added. The material was highly refractory and when heated in an oxidizing atmosphere developed a heavy glaze coating on the exposed surfaces of the grains.

This large a proportion of Mo is not necessary to impart oxidation resistance but I find that even a small amount such as 2% of Mo which on oxidation forms $MoSi_2$ with roughly 60% its weight of silicon is quite helpful in this respect.

I have found that in general it is desirable to have at least enough carbon to reduce all the oxides present to metal and the oxygen to CO. Up to 10% more carbon than that required for this reaction may be included in the mix since some carbon burns away in the air during furnacing and the extra carbon also prevents reoxidation of the consituents of the fused mass. Also, particularly for very hard compositions, it is desirable to increase $B_2O_3$ materially above the amount computed to form diborides of all the metals and silicon present, for instance up to treble that amount.

*Example 5*

As an example illustrating the use of SiC in place of $SiO_2$, I took the following mixture:

| | Lbs. |
|---|---|
| Rutile | 83 |
| SiC (100 mesh and finer) | 83 |
| $B_2O_3$ | 297 |
| Carbon (coke breeze) | 170 |

This I fused in an arc furnace as before, obtaining again a hard, silvery metallic pig of excellent abrasive texture. This material again corresponds to point 2 on the diagram with about 8% carbon in addition to that required to reduce all oxides to CO and metal.

To prepare my fusion products for use, I remove the pig from the furnace and scrape or grind off the unfused outer portions. I then crush the fused material to 8 mesh and finer or 14 mesh and finer, boil it in water and decant from time to time. In this way unreacted carbon and soluble boron compounds are removed. Clean material is particularly needed when the material is to be hot pressed or otherwise self bonded.

In the manufacture of gauge blocks and other hard smooth surfaces including certain refractory applications, I prefer to self bond my materials by compressing them in graphite molds, electrically heated to 1500° C. or more under pressures at least 200 p.s.i. in inert atmospheres.

I may also self bond my materials by first compacting them and then firing to sinter the material in inert atmospheres. To make abrasive bodies, I take sized grain particles and bond them with any of the commonly used abrasive binders such as phenolic resins, rubber, shellac or ceramic binders.

As an example, I took the material of Example 1 above, reduced it to 40 to 80 mesh/inch size and made it into a grinding wheel using 8.07% by weight of phenolic resin binder, using the techniques familiar in the manufacture of resin bonded wheels.

After curing this wheel in the manner usual for resin bonded wheels it had a density of 0.0833 lbs./cu. in. and was adjudged a relatively soft wheel. This was mounted on a Cincinnati #2 grinder and tested by grinding titanium metal which is generally regarded as difficult to grind. My wheel easily made heavy cuts on it. I also ground steel readily with the wheel although the wheel grade was softer (due to the small amount of bond used) than would normally be used to grind steel.

I also tested my material as an abrasive in loose form by suspending 40 to 70 mesh material from Example 1 in a slurry of bentonite in water. This was applied to a rotating steel disc as a lapping compound and blocks of various materials pressed against the disc. Somewhat to my surprise, not only sapphire boules of pure fused aluminum oxide but also massive solid blocks of crystalline silicon carbide were rapidly abraded by the slurry.

It has been my observation that the hardness of my materials, while always high, increases with increasing boron content.

I have experimented further with the use of other cheap ores such as ilmenite in forming my type of materials but find that the presence of iron, etc., detracts from their hardness and refractoriness. When materials other than zirconium and titanium are to be added, I prefer to use metals which form hard borides as the addition products or modifiers.

I have mentioned above the lack of positive knowledge as to the nature of the exact compounds physically constituting my final fused material. This is because at the temperature of the electric arc many reactions are possible in as complex a furnace charge as I use, producing various compounds in intimate, microscopic crystal admixture as well as solid solutions of various ingredients in one another. Such ingredients are practically almost impossible to separate and since nothing would appear to be gained from their identification I have not pursued this theoretical study.

What I claim is:

1. As a new composition of matter, a fused mass consisting of 27 to 65 parts by weight of boron, 12 to 45 parts by weight of silicon and such proportion of a metal selected from the group consisting of Zr and Ti as to make its composition fall within the area ABCDE of the drawing.

2. The composition of claim 1, in which boron is present in amount between that required to form diborides of the silicon and metal present and treble that proportion of boron.

3. The composition of claim 1, in which the metal is zirconium.

4. The composition of claim 1, in which the metal is titanium.

5. The method of making a new composition of matter which consists in fusing together a mixture of boric oxide, zircon and carbon, the boric oxide and zircon being present in such proportions as to make the ratio of B:Si:Zr in the resultant fusion fall within the area ABCDE of the drawing and the carbon being present in sufficient quantity to combine with the oxygen from said boric oxide and zircon to form CO therewith plus not to exceed 10% excess carbon above that amount.

6. A new composition of matter consisting of a fused mixture of boron and silicon plus a metal of the group consisting of zirconium and titanium, and carbon, the boron, silicon and metal being in such proportions as to make the composition of the mixture thereof fall within the area ABCDE of the drawing, and the carbon being in an amount up to 10% greater than above the amount of carbon required to reduce said other ingredients from oxidic form to metal.

7. The method of making a new composition of matter which consists in fusing together oxidic compounds of boron, of silicon and of a metal of the group consisting of zirconium and titanium, together with carbon sufficient to reduce said oxidic compounds to metal, the carbon being introduced in the form of a carbonaceous reducing material from the group consisting of carbon and the carbides of boron, silicon, zirconium and titanium, all of said materials in the mixture being present in such proportions as to cause the ratio B:Si:Metal to fall within the line ABCDE of the drawing.

8. The method of making a new composition of matter which consists in fusing together oxidic compounds of boron, silicon and a metal selected from the group consisting of Zr and Ti together with silicon carbide sufficient to reduce said oxidic compounds to metal, the various materials being present in such proportions as to cause the ratio of boron to silicon to metal in the resultant fusion to fall within the line ABCDE of the drawing.

References Cited in the file of this patent

UNITED STATES PATENTS

| | | |
|---|---|---|
| 2,637,091 | Nicholson | May 5, 1953 |
| 2,814,566 | Glaser | Nov. 26, 1957 |
| 2,908,553 | Frank et al. | Oct. 13, 1959 |

FOREIGN PATENTS

| | | |
|---|---|---|
| 478,016 | Great Britain | Jan. 11, 1938 |
| 716,604 | Great Britain | Oct. 13, 1954 |